Jan. 5, 1960 G. W. FYLER 2,920,135

WAVE SIGNAL RECEIVERS

Filed March 24, 1958 2 Sheets-Sheet 1

Inventor
George W. Fyler
By Francis W. Crotty
Attorney

Inventor
George W. Fyler
By Francis W. Crotty
Attorney

United States Patent Office 2,920,135

Patented Jan. 5, 1960

2,920,135

WAVE SIGNAL RECEIVERS

George W. Fyler, Lombard, Ill., assignor to Zenith Radio Corporation, a corporation of Delaware Application March 24, 1958, Serial No. 723,494

9 Claims. (Cl. 178—5.8)

Figure 1:
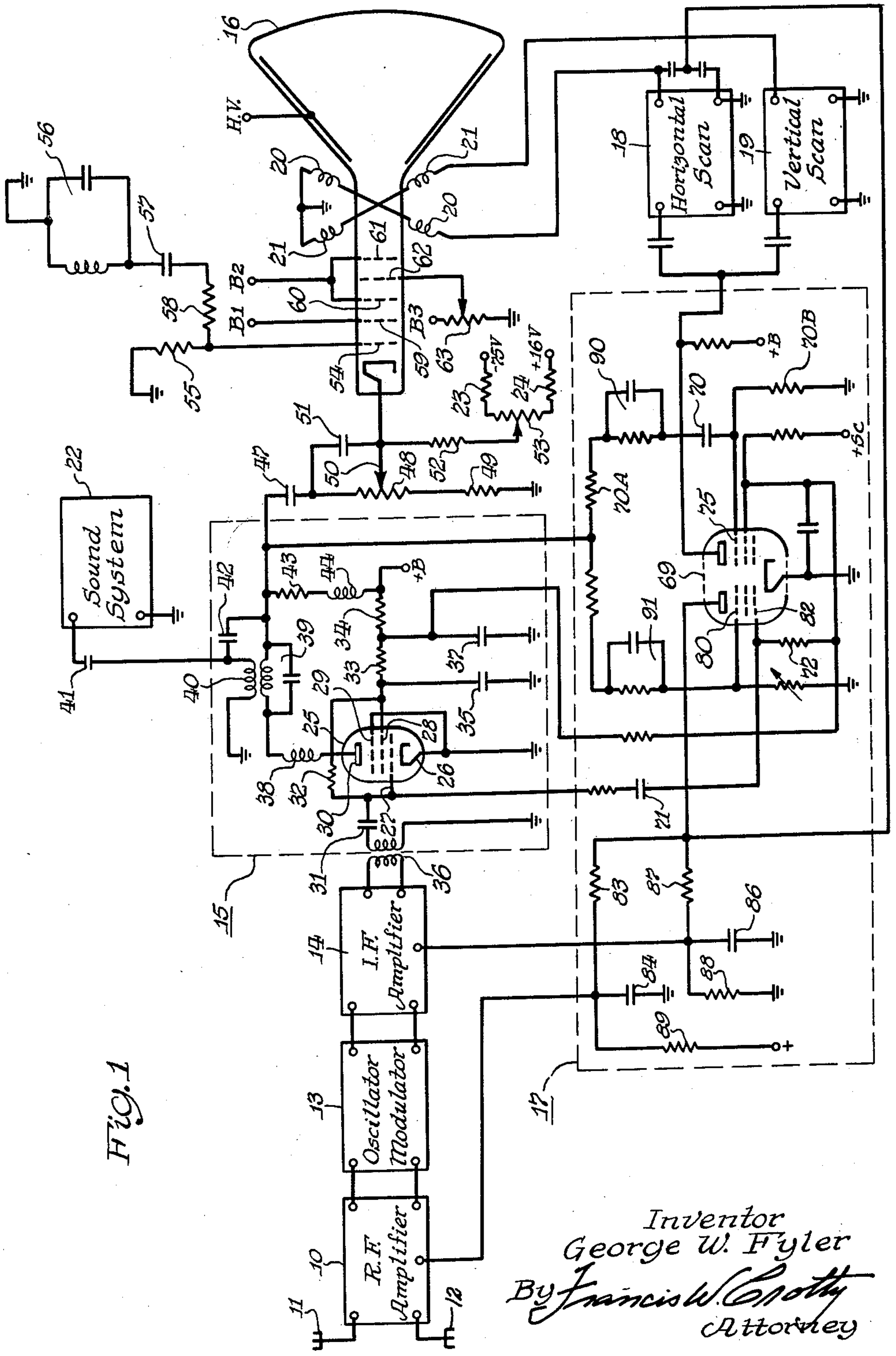

This invention relates to wave signal receivers in general and is particularly concerned, among other things, with the construction of a detector-amplifier for such receivers. Although the invention is subject to a variety of applications, it is especially suited for inclusion in a television receiver and, for convenience, will be described in that connection.

Television receivers currently being manufactured are, for the most part, of the so-called intercarrier-sound type, featuring a single intermediate-frequency channel through which both the intermediate-frequency video signal and intermediate-frequency audio signal are translated. At the video detector, where the video modulation is extracted from its carrier, there is produced an intermodulation product of the intermediate-frequency signals referred to as the intercarrier component. It is a carrier of fixed frequency because the television-modulated and sound-modulated signals have a fixed frequency separation and it is modulated by the sound program. The intercarrier component is separated out at the video detector or at a subsequent video amplifier and is delivered to the audio system while the video components, including picture and synchronizing information, are amplified and supplied to the image reproducer and scanning system.

Such a receiver is attractive in that it represents a material simplification over earlier apparatus approaches to television reception which employed separate intermediate-frequency channels for the video and sound and required close control of the operating frequency of the local oscillator. This requirement has been considerably relaxed with the intercarrier design and the economy of parts is self-evident.

The present invention aims at even further simplification of the receiver apparatus by employing a combined detector-amplifier of improved construction, permitting elimination of the video detector and video amplifier stages as such. It provides a single stage, serving as the video detector, video amplifier, intercarrier component-separating network and signal source for the scanning and automatic gain control systems.

Earlier attempts have been made to supersede the video detector and amplifier by the use of a single stage, but they have not proven out either because the gain available was inadequate for direct drive of the picture tube, or because of limitations imposed by the signal level requirements of the detector-amplifier itself. For example, a previously suggested arrangement features the use of an anode-bend detector but such a detector is known to have inherent limitations, including restricted gain and limited or insufficient signal output.

It is an object of the present invention, therefore, to provide a wave signal receiver characterized by an improved detector-amplifier.

It is a further object of the invention to provide a receiver construction of improved economy, attained through the use of a novel detector-amplifier exhibiting a much greater gain commensurate with linearity than heretofore attained with prior devices employed for combined detection and amplification.

It is a specific object of the invention to provide a receiver of the intercarrier type of greatly simplified construction.

A wave signal receiver embodying the teachings of the present invention comprises a detector-amplifier including an electron-discharge device having an anode, a cathode, and a control electrode. It further comprises an input circuit including a condenser series-connected to the control electrode, for applying a modulated carrier wave signal thereto. Means, including a source of positive D.C. potential, high in value relative to the signal input level and a resistor constitute a constant current source for establishing a component of control electrode-cathode current flow in the detector substantially equal to the contact potential current of the detector with its control electrode short circuited to the cathode. Finally, the receiver includes a load circuit connected between the anode and cathode for utilizing the detected and amplified modulation components of a received modulated carrier signal.

Figure 2:
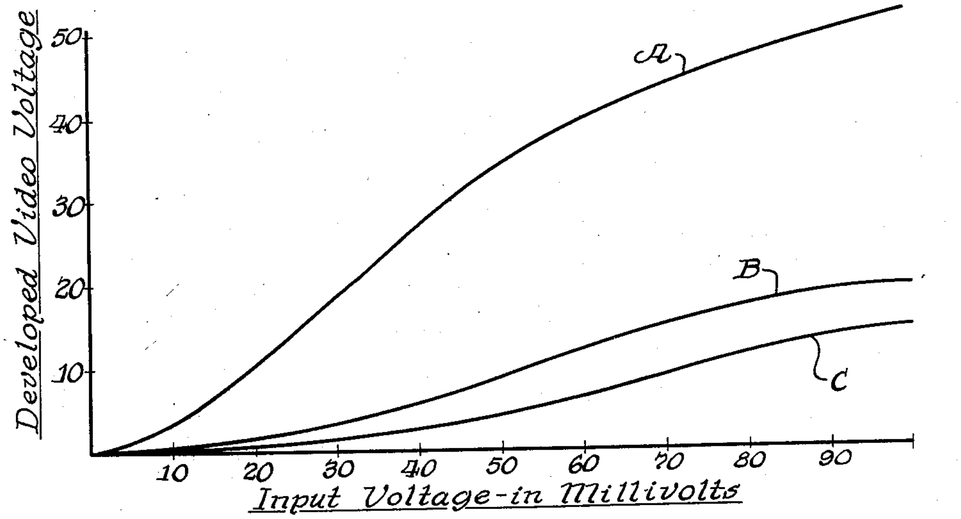
Figure 3:
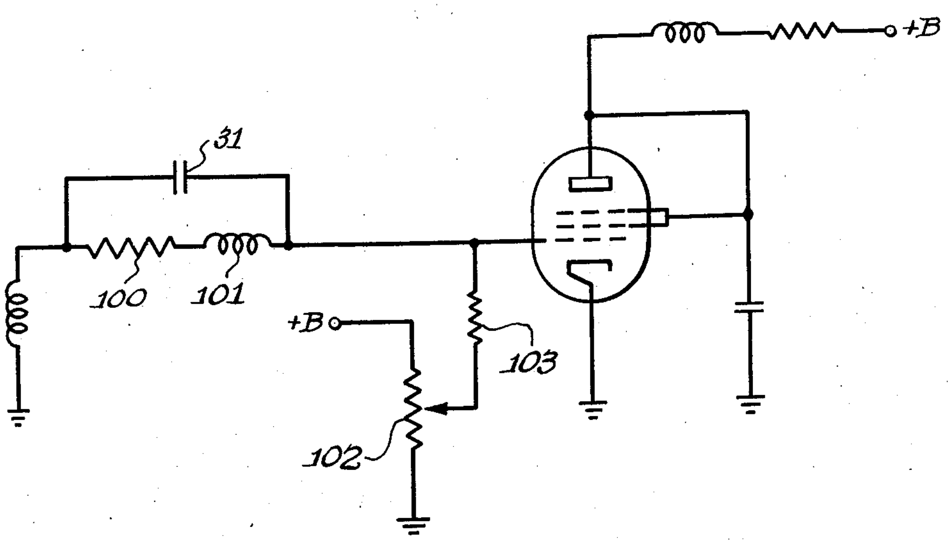

The features of the present invention which are believed to be novel are set forth with particularity in the appended claims. The invention, together with further objects and advantages thereof, may best be understood with reference to the following description taken in connection with the accompanying drawings in the several figures of which like reference numerals indicate like elements and in which:

Figure 1 is a schematic diagram of an intercarrier type television receiver embodying the present invention;

Figure 2 includes characteristic curves illustrating the comparative performance attained with a detector amplifier embodying the present invention contrasted with structures of the prior art; and Figure 3 is a schematic diagram representing a modification of the detector amplifier of the receiver of Figure 1.

Referring now more particularly to Figure 1, the arrangement there represented is a television receiver of the intercarrier-sound type which has been chosen for purposes of illustration and also because it is a particularly desirable application of the invention although it will be understood, as indicated above, that the invention is not so limited in utility. It may be advantageously employed with any wave signal receiver intended to utilize modulated carrier-wave signals and may, of course, be utilized with other types of television receivers, such as those utilizing separate intermediate-frequency channels for video and sound. The receiver under consideration comprises a radio-frequency amplifier 10 of any desired number of stages, having an input circuit coupled to a receiving antenna system 11, 12 and also having a tuning mechanism of any well-known design and construction, actuable to render the amplifier selective to any particular one of the television broadcast signals available in the receiver location. An oscillator-modulator 13 is coupled in cascade with amplifier 10 and its oscillator section is tunable concurrently with adjustment of the tuning mechanism of the R-F amplifier in known manner for the purpose of developing an intermediate frequency of fixed value. Connected in cascade to oscillator-modulator 13 are an intermediate-frequency amplifier 14 having any desired numbers of stages of amplification, a detector-amplifier 15 to be described in detail hereinafter, and an image-reproducing device shown as a cathode-ray tube 16 of the low-drive cathode-driven type. Such a tube is described and claimed in a copending application Serial No. 645,813, filed March 13, 1957, in the name of C. Szegho.

A synchronizing signal separator and automatic gain control system 17 is coupled to detector-amplifier 15. The synchronizing-signal separator section of unit 17 is coupled to synchronizing circuits of a horizontal scanning system 18 and a vertical scanning system 19 having output terminals which are coupled respectively to horizontal deflection windings 20, 20 and vertical deflection windings 21, 21 of the magnetic deflection yoke of picture tube 16. On the other hand, the AGC section of unit 17 is coupled to both R-F amplifier 10 and I-F amplifier 14. Time gating of the AGC section is accomplished, if desired, by feeding output pulses from the horizontal system to the anode of the AGC tube as indicated although the anode may alternatively be connected to a source of positive potential if time gating is not to be employed. The synchronizing-signal separator included in unit 17 is of the type described and claimed in U.S. Letters Patent 2,814,671, issued November 26, 1957, to R. Adler et al. and assigned to the same assignee as the present invention. A suitable arrangement of a combined synchronizing signal separator and AGC system is the subject of a copending application, Serial No. 568,049 filed in the name of R. Adler et al. on February 27, 1956, and assigned to the same assignee as the present invention.

A sound system 22 which will be understood to include conventional stages of audio detection and amplification as well as a sound reproducer or loudspeaker is also coupled with an output circuit of detector-amplifier 15 to utilize the intercarrier component derived therefrom in the detecting process.

The described receiver, except for units 15 and 17 and certain control circuits associated with picture tube 16, is entirely conventional in construction and operation. The tuner of amplifier 10 is adjusted to accept from antenna system 11, 12 a desired one of the television broadcasts available in the area in which the receiver is situated and the selected signal will be understood to be one of conventional specification, namely, a negatively-modulated television signal having video frequency components in one amplitude range and synchronizing signal components in another amplitude range of a modulated radio-frequency carrier. An audio-modulated signal representing the accompanying sound program is concurrently received in the form of a frequency-modulated carrier wave having a fixed frequency separation—specifically 4.5 megacycles—from the carrier frequency of the television signal. These signals after amplification in amplifier 10 are delivered to the first detector or oscillator-modulator 13 wherein they are converted to intermediate-frequency video and sound signals. After amplification in amplifier 14 the modulation components of the television signal are developed in the detector section of unit 15 and are amplified in the amplifier portion and then supplied to the cathode of picture tube 16. The video modulation, including the synchronizing signal components, are concurrently supplied to synchronizing signal separator and AGC system 17 wherein the synchronizing components are separated from the video information for application to scanning systems 18, 19. Accordingly, the cathode-ray beam of picture tube 16 is intensity modulated with the video frequency information while that beam is tracing successive rasters of spaced parallel lines on the screen area of the tube under the influence of properly synchronized or timed deflection signals energizing deflection coils 20, 20 and 21, 21. In this fashion, an image representing the video intelligence is synthesized on the screen of the picture tube in an entirely conventional manner and, at the same time, the accompanying sound information is reproduced in sound system 22. The sound reproduction results from the fact that an intercarrier component, a 4½ megacycle signal frequency modulated with the sound information, is developed as an intermodulation product in the detector section of unit 15, is amplified in that same unit and delivered to sound system 22.

The gain control potential developed in unit 17 and applied to amplifiers 10 and 14 serves to maintain the intensity of signals delivered to the input circuit of unit 15 within a relatively narrow range of amplitude variations in spite of wider fluctuations of intensity between received signals. More detailed consideration will now be given to the amplifier-detector and the circuitry associated with both picture tube 16 and synchronizing-signal separator and AGC system 17.

The amplifier-detector comprises an electron-discharge device or tube 25 shown as a pentode having a cathode 26, a first grid or control electrode 27, a screen grid 28, a suppressor electrode 29, and an anode 30. A condenser 31 series-connected to control electrode 27 and the secondary winding of a coupling transformer 36 constitutes means for applying the intermediate-frequency video and sound carrier signals to tube 25. The value of condenser 31 is proportioned with respect to the characteristics of the detector tube so that the stage has the bandwidth required faithfully to translate the applied signals. For example, it will be apparent that this condenser in conjunction with the inter-electrode capacitance of grid 27 to cathode 26 constitute a capacitive type voltage divider which tunes the secondary of coupling transformer 36. Consequently, if condenser 31 has too small a value in relation to the inter-electrode capacitance of grid cathode, there is a loss of intermediate-frequency signal on grid 27 of the detector. At the same time, detection is accomplished in the input circuit of tube 25, as will be explained more particularly hereinafter, and therefore the video voltage is developed across condenser 31. For that reason, if the value of the condenser is too large, there is a tendency to lose high-frequency video components or, expressed in other words, a degradation of bandwidth is experienced. It is manifest that a compromise value of capacitance is selected and in one application of the invention, which has been operated very satisfactorily making use of a type 6DK6 tube as the detector-amplifier, a value of the condenser approximately equal to the grid-to-cathode inter-electrode capacitance was found to be optimum. Of course, it is recognized that the use of other specific types of pentode tubes or bandwidths requirements may dictate specifically different values of condenser 31, although it is likely that, for the reception of television signals, the condenser should have a value of the same order of magnitude as the grid-to-cathode capacitance of the detector.

While the input circuit of detector tube 25 has the general appearance of the conventional grid leak detector, it is in fact uniquely different from the ordinary construction employed in that the detector in question has means constituting a constant current source for establishing grid-cathode current flow in the tube. This means is provided by a grid resistor 32 having a value that is very high compared with usual detector loads and a source of D.C. voltage, very high compared with the developed signal voltage. Resistor 32 is connected between grid 27 and a source of positive D.C. potential indicated +B being connected thereto through series resistors 33 and 34 which concurrently serve to connect screen electrode 28 to the same source of potential. Of course, resistor 32 may be coupled to that potential source through the anode circuit of tube 25, if desired. Shunt condensers 35 and 37 in conjunction with resistors 33, 34 form a filter for filtering intermediate frequency and video-frequency components in the screen grid circuit. The suppressor electrode 29 is coupled to the cathode which, in turn, is grounded and the anode 30 connects to potential source B+ through a series peaking coil 38 and two networks designed to effect a desired signal separation in the anode load circuit. The first such network includes a circuit 39 which is tuned to 4.5 megacycles, the carrier-frequency of the intercarrier sound component developed in the detecting process. The inductor of tuned circuit 39 forms the primary winding of a coupling transformer 40 through which the inter-carrier signal is extracted from the detector-amplifier and applied by way of a coupling condenser 41 to the input circuit of sound system 22. Condenser 42 provides a feedback path through which a component of the intercarrier signal is fed back into the anode circuit of tube 25 to cancel out any component of the intercarrier signal that might otherwise tend to be developed across the remaining network of the anode circuit employed as a video-frequency load. This load is constituted of a resistor 43 and another video-frequency peaking coil 44 which connects with potential source +B.

The coupling between the video load circuit of detector-amplifier 25 and the cathode of picture tube 16 is arranged to provide adjustments for both contrast and brightness. This is accomplished in a manner which minimizes flicker or other undesired influences in the reproduced picture with adjustments in contrast and brightness and also reduces any tendency of the contrast adjustment, to reflect adversely upon the detector circuit. More specifically, the coupling is through a condenser 47, a potentiometer 48 and a resistor 49. Tap 50 of the potentiometer is conductively connected to the cathode of the picture tube and is returned to the top of the potentiometer through a condenser 51. Brightness control is accomplished by adding a negative biasing current to the contrast control so that the biasing current increases somewhat slower than the video signal with adjustments in contrast control 50. To that end, the contrast control is coupled through a resistor 52 to the tap of a potentiometer 53 which is connected by means of resistors 23 and 24 between a negative polarity potential source —B and a point which is positive with respect to ground, designated +16 v. This permits normal contrast control action with reasonable low brightness at minimum contrast settings.

The first grid 54 of picture tube 16 is coupled to ground through a resistor 55 having a low resistance compared with that from grid to cathode and receives retrace blockout signals from a tuned circuit 56 which usually is a component of the vertical deflection circuit. This tuned circuit is capacitively coupled to grid 54 through a coupling condenser 57 and resistor 58. The third grid 59 is coupled to a source of operating potential $B_1$, the fourth and fifth grids 60, 61 are energized from a potential source $B_2$, and the intermediate or fourth grid 62 is connected to a focus control, shown as a potentiometer resistor 63 connected between a source of positive potential $B_3$ in ground. The final anode of the tube which normally takes the form of a coating of aquadag or other conductive material is connected to a high voltage source represented by the terminal designated HV. The operating potentials for electrodes 59, 60 and 61 of the picture tube may be derived from the same high voltage source which excites the final anode in well-known and strictly conventional manner.

The operation of detector-amplifier 25 in demodulating the applied intermediate-frequency signal and exciting picture tube 16 will now be considered. Resistor 32 in connecting grid 27 of the detector to a high source of positive D.C. potential functions in a manner analogous to a clamping circuit in that it establishes a flow of grid current in the order of 120–250 microamperes. The value of resistor 32 is very much higher than used in conventional grid-leak detector circuits and the clamping circuit is essentially a constant current circuit. Its parameters are adjusted to establish a component of grid current in tube 25 which is substantially equal to the contact potential current of the tube with its grid short circuited to its cathode. The application of a modulated carrier signal of intermediate frequency, being applied to condenser 31, results in input circuit detection in tube 25 with grid 27 and cathode 26 functioning in a manner somewhat analogous to that of a diode detector. In the absence of signal, the potential of grid 27 with respect to cathode is essentially zero in view of the clamping current and its relation to the contact-potential current of tube 25. Positive signal excursions of the grid are not reflected in perturbations or modulations of the electron stream issuing from cathode 26 but signal excursions in the other sense, that is, in a negative direction do influence the electron stream and plate current of tube 25. In net effect, detection is accomplished in the input circuit with the result that there is present on grid 27 the detected modulation components plus the modulated intermediate-frequency signal. These signals present on the grid modulate the plate current of tube 25 to effect amplification in precisely the same manner in which signal amplification is accomplished in any pentode device. The amplified signal is selectively utilized or, in effect, separated in the anode/cathode circuit.

More particularly, network 39 in the anode/cathode circuit is selective to the intercarrier component which is occasioned as an intermodulation product of the intermediate-frequency video and sound signals as an incident to the detection process. The intercarrier signal is transferred by means of transformer 40 to sound system 22 for utilization therein. Network 43, 44 is particularly designed as a video load with compensation resulting from normal peaking coil techniques to the end that the video modulation components are delivered from load 43, 44 through coupling network 47—50 to the cathode of picture tube 16. The position of contrast adjustment 50 determines the intensity of the applied video signal in the usual way.

It is apparent that a demodulated signal of negative polarity, that is to say, with negative going synchronizing components and video frequency components, is developed in the input circuit of tube 25. By virtue of the polarity inversion incident to amplification through a single-stage amplifier, a television signal with opposite polarity, that is with positive going synchronizing components and video components, is present in the anode/cathode circuit of tube 25. This, of course, is the polarity required for a cathode-driven picture tube of the type represented.

The impedance relations of the picture tube in respect of the video driving stage and its brightness-contrast controls further distinguish the receiver under consideration from prior arrangements. The distinguishing aspects result from the fact that the tube, as indicated above, is a low-drive cathode-driven device. It requires a biasing current of proper value at its various contrast settings whereas conventional tubes require only appropriate values of grid potential. The biasing current for tube 16 is afforded by the brightness control circuit including resistor 52, the effective portion of potentiometer 48 and resistor 49. Resistor 23 in the brightness-control circuit determines the range of bias current traversing resistor 52 while resistor 24 in conjunction with the positive potential source facilitates adjustment to zero brightness. Moreover, the load represented by picture tube 16 is small in comparison with the plate or anode load of tube 25, driving the image reproducer. In the usual receiver having a grid-driven picture tube, these impedance relations are reversed; the input circuit of the picture tube is a high impedance compared with the plate load which drives it. For tube 16, this impedance relation necessitates resistor 49 to limit the minimum contrast setting and further requires carefully selected values for resistors 52, 53 and 55 in order to avoid loss of video information. For a 14" low-drive tube, the following values of components were found to give satisfactory operation:

| | | |
|---|---|---|
| Condenser **47** | microfarad | 0.68 |
| Condenser **51** | micromicrofarads | 8 |
| Inductor **44** | microhenries | 137 |
| Resistor **23** | ohms | 47,000 |
| Resistors **24** and **43** | ohms, each | 4,700 |
| Resistor **48** | ohms | 20,000 |
| Resistor **49** | do | 330 |
| Resistor **52** | do | 22,000 |

| | | |
|---|---|---|
| Resistor 53 | do | 20,000 |
| Resistor 55 | do | 470 |
| Resistor 58 | do | 10,000 |
| Potential source of brightness-control | volts | +16 to −75 |

The ability of the detector-amplifier to produce detected signals of opposed polarities in its grid and anode circuits renders the detector especially useful as a source for supplying signals to the synchronizing-signal separator section of unit 17. That separator, as described in detail in the above-identified patent to Adler, is characterized by unusual freedom from noise and is in the nature of a separator having internal noise switching. It will be observed that a positive polarity video signal is delivered from detector-amplifier 15 through a network including a resistor 70A and a condenser 70 to the grid 75 of a tube 69 which has two pentode sections. The first grids 82 of both sections are interconnected within the tube envelope and a connection including a condenser 71 couples the detector grid, where a negative polarity detected video signal is available, to this first grid 82 of both pentode sections. These grids are also coupled through a resistor 72 to the source of screen potential +SC which normally biases such grids positively.

In operation, the positive bias of the first control grid may be likened to a gate which opens a path for an electron stream from the cathode to the second grid 75 which, in turn, modulates the stream in accordance with the demodulated video signal applied thereto from detector-amplifier 15. As explained in detail in the afore-identified Adler patent, grid 75 is of the self-biasing type and in the absence of noise functions to deliver only synchronizing signal components to the output circuit of its associated anode from which the synchronizing signals are supplied to scanning systems 18, 19. In the presence of a spurious signal, such as a noise-pulse having an amplitude exceeding that of the synchronizing signal component, current flow is interrupted because that noise component appears on the first grid 82 of the pentode section with negative polarity and biases the section to anode current cut off. This not only prevents translation of the unwanted noise signal to the scanning systems where it could disturb the timing, but further prevents paralysis or blocking at grid 75 of the synchronizing-signal separator which might otherwise be experienced were that high-intensity pulse which appears with positive polarity at grid 75 permitted to establish a charge potential on condenser 70. The operation of this type of synchronizing-signal separator is explained in detail in the Adler patent identified above.

The operation of the other pentode section of tube 69, namely that including control grids 80 and 82, is the same as outlined in conjunction with the synchronizing-signal separating process. Essentially, only synchronizing-signal components are translated to the anode circuit and the amplitude variations of those components are directly related to intensity variations of the received signal. Moreover, they are manifest in variations of the signal level in the anode circuit of this pentode section so that the AGC potential applied to IF amplifier 14 through a voltage divider including resistors 87, 88 and a filter condenser 86 control the gain of that amplifier with variations in intensity of the received signal in well-known way. In similar fashion, another filter including components 83, 84 applies AGC potential to amplifier 10 but this is delayed AGC action in view of the delay potential supplied by a resistor 89 from a source of positive voltage. The optimum relationship between RF and IF AGC potentials is well known in the art.

It will be observed that the coupling network extending from detector-amplifier 15 to second control grid 75 of the synchronizing-signal separator section of tube 69 includes two well known time-constant circuits, one comprising the condenser 70 and a resistor 70A and the other comprising the R-C network 90. However, the corresponding coupling from detector-amplifier 15 to second control grid 80 of the AGC section of tube 69 has but a single time-constant network 91. These and other details of the circuitry of unit 17 which, per se, constitute no part of the present invention are fully disclosed in the aforementioned copending application of Adler et al.

Comparative experiments were conducted to determine the output or detected video voltage obtained from detector-amplifier 15 in relation to the detected voltage obtained from a conventional grid-leak detector and a plate detector. The relative performance is represented by the curves of Figure 2 wherein curves A, B and C relate detected output voltage as a function of applied signal voltage for detector-amplifier 15, for a conventional grid-leak detector and for a plate detector, respectively. It is apparent upon inspection that the subject detector provides a materially larger output voltage than either of the prior art devices, has improved linearity as represented by the extended linear portion of its characteristic and has greater gain.

The increased output and gain of the described detector-amplifier is attributed to the use of constant biasing or clamping current and a number of related factors. The rise time of the detector circuit is determined by the series condenser 31 and is very short. The fall time is determined by the current flow through resistor 32 and the amount of capacitance being discharged; it also is even shorter in this circuit. More D.C. potential per volt of I.-F. signal is developed in the grid circuit through rectification than with conventional input circuit detectors and the operating point starts at or near zero bias because of the clamping current. This is an operating point of high transconductance so that the output of the detector is also much greater than that of the conventional grid-leak detector. Moreover, the operating conditions permit more signal voltage to be applied within the grid cut-off limit of the tube characteristic.

More overall gain in the receiver results from the operating condition (increased signal output) of the detector plus a considerable reduction in circuit loading, that is to say, higher effective A.C. resistance reflected on the driver output circuit and allowing greater overall gain. The improved circuit loading also derives from the constant-current clamping phenomenon. It may be shown that in this detector the effective A.C. resistance reflected on the driver circuit varies directly as a function of applied signal voltage and inversely with the clamping current. Consequently, the A.C. resistance which has a particular value at a signal level of one volt has twice that value at a signal level of two volts. The detector therefore permits a higher gain $x$ bandwidth product in the driver stage than prior-art devices.

The characteristics of Figure 2 were taken under operating conditions which reflected the variation in loading and tuning effects that the different detectors have on their driving circuits. A driver tube was used together with a double-tuned transformer having the proper bandwidth and tuning for each condition. The secondary of the transformer feeding the detector was tuned only by the input capacity of the tube and the series grid condenser, where that condenser would be employed as a part of the detector. It was found that the bandwidth tends to vary with signal amplitude in all of the circuits examined so that the bandwidths were determined at the half-amplitude point of the characteristics. Further, the applied signal was approximately at the middle of the I.-F. pass band and the I.-F. curves were substantially flat for each detector circuit. The resistor 32 of amplifier-detector tube 25 had a value of 1 megohm, and condenser 31 had the same value as in the grid leak detector. Screen electrode 28 was maintained at a potential of 120 volts D.C. for all curves. The intermediate-frequency bandwidth was approximately 3.6 megacycles with a median frequency of 44 megacycles in the driven transformer.

In the circuit arrangement of Figure 1, a peak-to-peak video voltage in the order of 40 volts peak was obtained in a pentode connection contrasted with a voltage of approximately 15 volts with a conventional grid-leak detector. The improvement through the use of the clamping circuit is manifest.

It is not necessary to use a pentode tube as the detector-amplifier; a triode may be used although the square-wave response is limited by the Miller effect. The triode-type arrangement is indicated in Figure 3 employing a pentode tube but with the screen and suppressor electrodes connected together and by-passed to ground. The control electrode is coupled to the secondary winding of an energizing transformer through a coupling condenser 31 shunted across resistor 100 in series with a video peaking coil 101. The clamping circuit also connected to the grid includes a potentiometer resistor 102 connected across a source +B of positive potential and conductively connected to the grid through a resistor 103. This circuit operates in the same manner as that described in connection with Figure 1, although the pentode version provides somewhat higher gain and has the added advantage of minimizing capacitive coupling between the anode and input circuits.

The described arrangement is especially attractive for production of economy model television receivers because it obviates the separate video detector and amplifier stages and associated circuitry such as that which would normally be employed as the separate load of the video detector. The one-tube circuit serves as the video detector and video amplifier. Additionally, it is the mechanism for separating out the intercarrier component required for delivery to the sound system and is especially attractive as a source for feeding the noise-immune synchronizing-signal separator and AGC system of the type employing two video signals concurrently applied to the unit with opposed polarities. It lends itself admirably to that application because of the presence of video signals of opposed polarities in the input and output circuits of the tube.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wave signal receiver comprising: a detector-amplifier including an electron-discharge device having an anode, a cathode, and a control electrode; an input circuit including a condenser series-connected to said control electrode for applying a modulated carrier-wave signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; and a load circuit connected between said anode and cathode.

2. A wave signal receiver comprising: a detector-amplifier including an electron-discharge device of the pentode type having an anode, a cathode, and a control electrode; an input circuit including a condenser series-connected to said control electrode for applying a modulated carrier-wave signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; and a load circuit connected between said anode and cathode.

3. A wave signal receiver comprising: a detector-amplifier including an electron-discharge device of the pentode type having an anode, a cathode, and a control electrode and having a certain interelectrode capacitance between said control electrode and cathode; an input circuit including a condenser series-connected to said control electrode for applying a modulated carrier-wave signal thereto; the capacitance of said condenser being proportioned with respect to said interelectrode capacitance to attain a pre-determined bandwidth for said detector-amplifier; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; and a load circuit connected between said anode and cathode.

4. A wave signal receiver comprising: a detector-amplifier including an electron-discharge device of the pentode type having an anode, a cathode, and a control electrode and having a certain interelectrode capacitance between said control electrode and cathode; an input circuit including a condenser series-connected to said control electrode for applying a modulated carrier-wave signal thereto; the capacitance of said condenser being approximately equal to said interelectrode capacitance; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; and a load circuit connected between said anode and cathode.

5. A wave signal receiver for utilizing modulated television signal having video components in one amplitude range and synchronizing components in another amplitude range, said receiver comprising: a detector-amplifier including an electron-discharge device having an anode, a cathode, and a control electrode; an input circuit including a condenser series-connected to said control electrode for applying a modulated carrier-wave signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; a video load circuit connected between said anode and cathode for utilizing said video components; a synchronizing-signal separator responsive to the conjoint application of opposed-polarity television signals; means coupled to said load circuit for applying a television signal with one polarity to said separator; and means coupled to said control electrode for applying a television signal with opposed polarity to said separator.

6. A wave signal receiver for utilizing a modulated television signal having video components in one amplitude range and synchronizing components in another amplitude range and for concurrently utilizing an audio modulated signal having a fixed frequency separation from said television signal, said receiver comprising: a detector-amplifier including an electron-discharge device having an anode, a cathode, and a control electrode; an input circuit including a condenser series-connected to said control electrode for applying a modulated carrier-wave signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; a video load circuit connected between said anode and cathode including a network selectively responsive to an intercarrier signal representing a modulation product of said television and audio signals and further including a network selectively responsive to said television signal for utilizing said video components; an audio system coupled to said intercarrier-selector network; a synchronizing-signal separator responsive to the simultaneous application of opposed-polarity television signals; means coupled to said load circuit for applying a television signal with one polarity to said separator; and means coupled to said control electrode for applying a television signal with opposed polarity to said separator.

7. A wave signal receiver for utilizing a modulated television signal having video components in one amplitude range and synchronizing components in another amplitude range, said receiver comprising: a detector-amplifier including an electron-discharge device having an anode, a cathode, and a control electrode; means including a condenser series-connected to said control electrode for applying said modulated television signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; and a video load circuit connected between said anode and cathode; a low-drive cathode-ray tube having a cathode coupled to said video load to effect intensity modulation of the beam of said tube and having a first grid; and means for maintaining said first grid at a reference potential.

8. A wave signal receiver for utilizing a modulated television signal having video components in one amplitude range and synchronizing components in another amplitude range, said receiver comprising: a detector-amplifier including an electron-discharge device having an anode, a cathode, and a control electrode; means, including a condenser series-connected to said control electrode for applying said modulated television signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; a video load circuit connected between said anode and cathode; a coupling network connected across said video load circuit including a contrast-control potentiometer and a fixed resistor arranged in the recited order; a low-drive cathode-ray tube having a cathode coupled to said potentiometer to effect intensity modulation of the beam of said tube and having a first grid; and means for maintaining said first grid at a reference potential.

9. A wave signal receiver for utilizing a modulated television signal having video components in one amplitude range and synchronizing components in another amplitude range, said receiver comprising: a detector-amplifier including an electron-discharge device having an anode, a cathode, and a control electrode; means, including a condenser series-connected to said control electrode, for applying said modulated television signal thereto; means, including a source of positive D.C. potential having a value high with respect to received signal intensity and a resistor, constituting a constant current source for establishing a component of control electrode-cathode current flow in said device substantially equal to the contact potential current of said device with the control electrode thereof short-circuited to its cathode; a video load circuit connected between said anode and cathode; a coupling network connected across said video load circuit including a contrast-control potentiometer and a fixed resistor arranged in the recited order; a low-drive cathode-ray tube having a cathode coupled to said potentiometer to effect intensity modulation of the beam of said tube and having a first grid; and means for maintaining said first grid at a reference potential; and a brightness-control circuit for establishing a biasing current of adjustable magnitude including the effective portion of the said contrast-control potentiometer and said first resistor.

No references cited.